(12) United States Patent
Nakayama

(10) Patent No.: US 8,407,243 B2
(45) Date of Patent: Mar. 26, 2013

(54) DEVICE AND METHODS FOR PRESENTING A SCROLLABLE USER INTERFACE

(75) Inventor: Vince Nakayama, Los Altos, CA (US)

(73) Assignee: Sony Corporation, Tokyo (JP)

( * ) Notice: Subject to any disclaimer, the term of this patent is extended or adjusted under 35 U.S.C. 154(b) by 47 days.

(21) Appl. No.: 13/036,701

(22) Filed: Feb. 28, 2011

(65) Prior Publication Data

US 2012/0221592 A1 Aug. 30, 2012

(51) Int. Cl.
*G06F 17/30* (2006.01)
*G09G 5/00* (2006.01)

(52) U.S. Cl. .......................... 707/769; 707/741; 345/684

(58) Field of Classification Search .................. 707/741, 707/769; 345/684
See application file for complete search history.

(56) References Cited

U.S. PATENT DOCUMENTS

| | | | |
|---|---|---|---|
| 6,370,363 B1 | 4/2002 | Fukuzato | |
| 6,697,483 B1 | 2/2004 | Saarinen et al. | |
| 2002/0089435 A1 | 7/2002 | Hanamoto et al. | |
| 2005/0270270 A1 | 12/2005 | Chadha | |
| 2008/0235621 A1 | 9/2008 | Boillot | |
| 2009/0322688 A1* | 12/2009 | Ording et al. ................. | 345/173 |
| 2010/0011304 A1* | 1/2010 | van Os .......................... | 715/762 |
| 2010/0231612 A1* | 9/2010 | Chaudhri et al. ............. | 345/684 |
| 2011/0187647 A1* | 8/2011 | Woloszynski et al. ........ | 345/168 |

FOREIGN PATENT DOCUMENTS

EP  813138  12/1997

OTHER PUBLICATIONS

Michael Grothaus and Erica Sadun, "Taking Your iPod Touch to the Max", chapter 3 "Interacting with Your iPod Touch" (pp. 55-89) and chapter 12 "Using Your Desk Set: Contacts, Calculator, Notes, Weather, Stocks, and Voice Memos" (pp. 295-318), 2010, Technology in Action iOS 5th Edition.*
Edison Mukadah et al., "Mobile Interface Design with Predictive Algorithm for Improved Text Entry", Rhodes University, Nov. 2007, pp. 1-85.*
Mobile Interface Design and Predictive Text Algorithm for Improved Text Entry; Edison Mukadah; http://citeseerx.ist.psu.edu/viewdoc/download;jsessionid=3015AC2B8E7F5BCDF7FB254 A29110E33?doi=10.1.1.103.9525&rep=rep1& type=pdf; Nov. 2007.
Implementing Google's "Did You Mean" feature in Java; Aug. 9, 2010.

* cited by examiner

*Primary Examiner* — Cheryl Lewis
(74) *Attorney, Agent, or Firm* — Haverstock & Owens LLP

(57) ABSTRACT

Methods and apparatus are provided for presenting a user interface. In one embodiment, a method includes displaying a scrollable list of characters associated with a character set, and detecting a selection of a displayed character of the scrollable list of characters. The method may further include displaying a search query based on the selection, updating a character set of the scrollable list based at least in part on the search query and index elements of a dataset, and displaying a result listing based on the search query, wherein the result listing identifies one or more index elements including a matching character sequence relative to the search query. Generating a search query may be based on adaptive updating of a list of characters that may be employed for generating search queries. Display of a result list may include an identification of matching character sequence.

21 Claims, 5 Drawing Sheets

DEVICE AND METHODS FOR PRESENTING A SCROLLABLE USER INTERFACE

FIELD

The present disclosure relates generally to presentation of a user interface, and more particularly to methods and apparatus for generating search queries and presenting the same via a scrollable user interface.

BACKGROUND

Many devices employ a user interface for controlling operation of the device. A typical input device employed is a keyboard, to provide one or more commands. However, many devices do not include interfaces for keyboards, or allow for operation with a keyboard. As such, some devices allow for a user to select characters of a user interface without the use of a keyboard. By way of example, some user interfaces display a grid of characters that a user must navigate to each character in order to select the character. This conventional approach allows for entering or selecting text based on characters that are selected. This method can be time consuming and is not suitable for many applications. Many users find this type of user interface to be slow and cumbersome due to navigation of the grid. Further, this method can require a large portion of the display screen to be required for display of the character grid.

There still exists a desire for user interfaces which do not require a keyboard. What is desired are methods and apparatus which provide a more powerful method for inputting text and operation of a user interface.

BRIEF SUMMARY OF THE EMBODIMENTS

Disclosed and claimed herein are methods and apparatus for presenting a user interface. In one embodiment, a method includes displaying, by a device, a scrollable list of characters associated with a character set, the display of the scrollable list including display of a focus element to identify a selectable character, and detecting a selection of a displayed character of the scrollable list of characters, the selection associated with the focus element. The method further includes displaying a search query based on the selection, updating a character set of the scrollable list based at least in part on the search query and index elements of a dataset, and displaying a result listing based on the search query, wherein the result listing identifies one or more index elements including a matching character sequence relative to the search query.

Other aspects, features, and techniques of the disclosure will be apparent to one skilled in the relevant art in view of the following detailed description of the disclosure.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
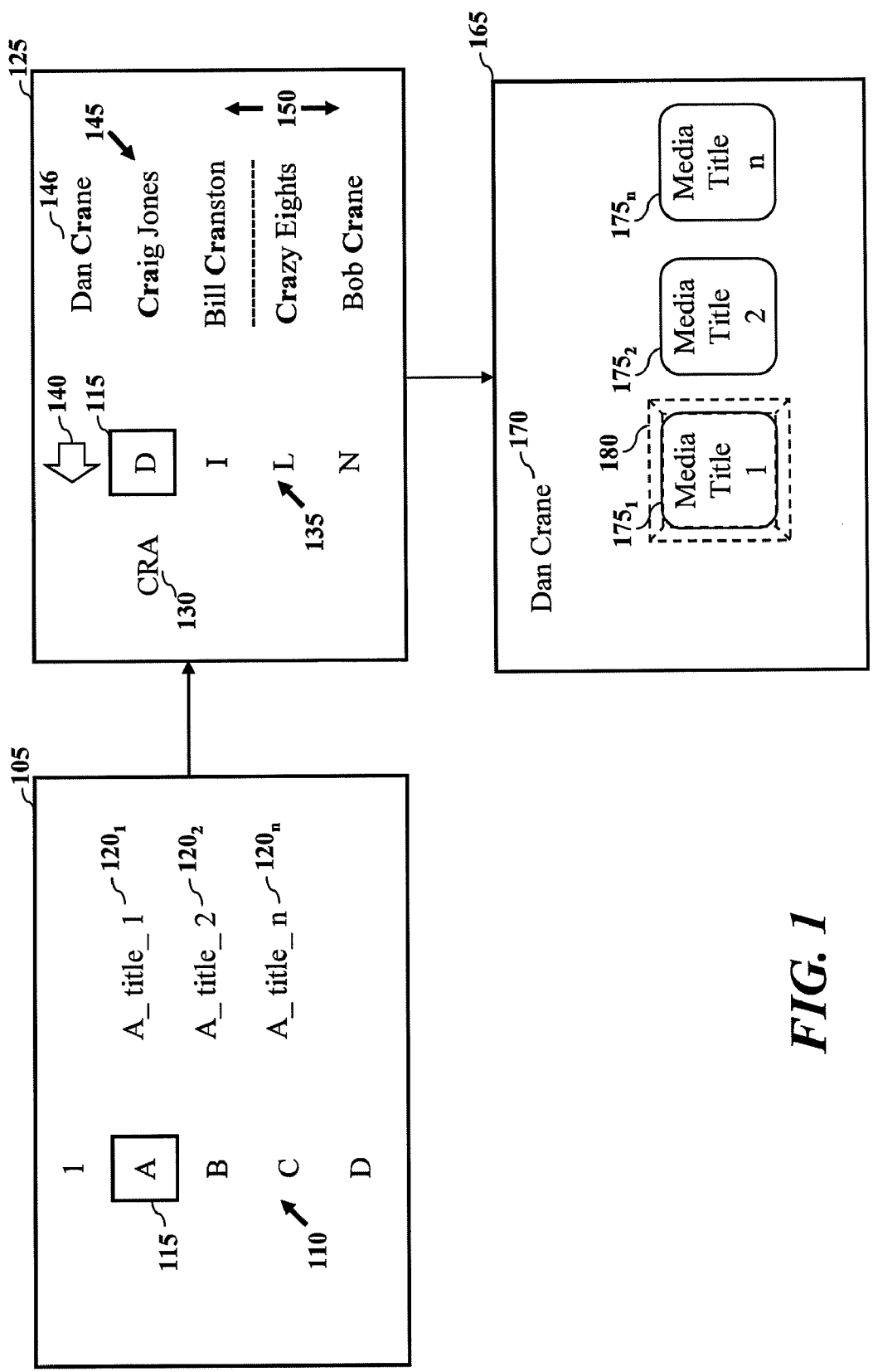
FIG. 1 depicts a graphical representation of user interface operation according to one or more embodiments.

One aspect of the disclosure is directed to presenting a user interface to allow for searching and selection of files, such as media titles, associated with a data set. Presentation of the user interface may include display of a scrollable list of characters that may be employed for creating search queries. One advantage of the embodiments described herein in may be the ability to build a search query based on one or more selections of the scrollable list and updating a character set of the list. By way of example, the scrollable list may be updated based on one or more of characters selected, and index elements of the data set. Based on a search query, the user interface may reduce the character of the scrollable list. In that fashion, characters may only be presented that allow for index elements of the data set to be searched.

In one embodiment method and device are provided for presenting a user interface and displaying a result listing based on one or more search queries. The user interface may additionally allow for selection and/or viewing of one or more search queries associated with previous searches. For example, previous search queries performed by a user may be displayed and accessed. Similarly, the user interface may be configured to present a listing of search queries that may be popular based on search queries of other user.

As described herein, the user interface and search capabilities may be applied to viewing and selection of files, such as media titles. However, it should also be appreciated that the methods and devices described herein may be employed for filling out forms, and network applications such as searching and browsing.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the disclosure is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the disclosure are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

One embodiment is directed to presenting a user interface including one or more graphical elements for generating a search query of a data set. Referring now to the figures, FIG. 1 depicts a graphical representation of user interface operation according to one or more embodiments. Based on one or more selections of user interface elements, the display of the user interface may be modified or updated. A display window of a user interface is depicted as 105 including presentation of list 110. List 110 relates to a scrollable list of characters. The scrollable list may be associated with a character set. Based on user input, such as directional or scrolling commands, the user interface may display a portion of the character set in list 110. Scrolling of list 110 may allow for selection of one or more characters by activation of a directional button of an input device. List 110 may scroll to allow a user to select a character that is associated with focus element 115. For example, during scrolling, characters of list 110 may be updated, that is for example to appear as scrolling up or down, while focus element 115 is displayed in a fixed position. In that fashion vertical navigation of the user interface may be provided. It may also be appreciated that focus element may be positioned vertically for elements other than list 110 to provide vertical navigation. Focus element 115 may relate to a selection box and may include a glow accent or similar display attributes. In certain embodiments, focus element 115 may be positioned at one or more positions of the user interface for selection of user interface elements. In that fashion, horizontal navigation may be provided, wherein the user interface may allow for selection of one or more results. Based on one or more user selections, a character set of list 110 may be modified. As such, the display of list 110 may be modified base on updates to and limitations on the character set.

According to one embodiment, a user interface may allow a user to scroll list 110, which may include characters arranged in alphabetical order, to view one or more index elements. In that fashion, the user interface may allow a user to browse possible search queries or media titles prior to generating a search query. As depicted in display window 105, the user interface includes a display of one or more titles, shown as results $120_{1-n}$ which may be associated with the selected or highlight character of list 110. User interface 105 may display one or more results $120_{1-n}$ based on a character associated with focus element 115. As depicted in display window 105, result listing $120_{1-n}$ may be based on the alphabetical listing of the character selected. Result listing $120_{1-n}$ is depicted as including a listing of titles associated with the letter "A" based on focus element 115 associated with character "A" of list 110. As will be discussed herein, results displayed by the user interface may relate to one or more index elements of a data set. For example, a data set may include one or more files, such as media titles. In one embodiment, metadata associated with each media title may be employed to index the data set. As such, index elements, may be generated based on the metadata. For media titles associated with movies or films, the index elements may relate to names of actors/actresses, name of a director, film name, category of the film, genre, etc. Individual display elements of result listing $120_{1-n}$ may relate to one or more index elements for the data set.

In one embodiment, presentation of elements of result listing $120_{1-n}$ may be prioritized. For example, a sub-set of index elements determined for the search query may be displayed on the user interface, wherein these elements are given preference in their presentation. One or more graphical elements of the user interface may be displayed to allow a user to select a media title for purchase and/or rent.

According to one embodiment, list 110 may be employed to search or identify one or more index elements of a data set. Index elements may relate to one or more keywords for files (e.g., media titles, etc) of the data set that may be accessed. Based on one or more selections of list 110, the user interface may display a search query for the selected characters. Additionally, the user interface may update the character set of the list based on elements of the data set. As depicted in display window 125, the user interface includes display of search query 130. Search query 130 is depicted as the character string "CRA" and may be based on user selection of characters from list 110. Following each selection of a character (e.g., letter, number, symbol, etc.), the user interface may update the character list. List 135 relates to an updated or modified list based on search query 130. The user interface may update the character set to reduce characters of the list that may be displayed. In that fashion, the characters that may be selected are reduced, as shown by list 135, and search queries may be limited to index elements of the data set.

In order to remove or delete one or more characters of the search query, user interface 125 includes back arrow 140 which may be selected by positioning focus element 115 on the arrow. User input command to select back arrow 140 can delete one or more characters from search query 130.

Based on search query 130, the user interface includes display of result listing 145. Result listing 145 includes a plurality of results based on search query 130 and index elements of a data set. In one embodiment, the result listing may provide queries or keywords for narrowing one or more media titles of the data set. In that fashion, users may select one or more titles of a data set based on selection of the result list. The result list may include keywords associated with a media title, actor, director, genre, etc. As depicted, result list 145 includes keywords for names that may be associated with one or more media titles. The order of elements of result listing 145 may be based on previous selections to the device. Alternatively, presentation of media titles may be ordered based on received data. In that fashion, media titles may be targeted. According to another embodiment, display of result listing 145 may include identification of matching character sequences in the results list, depicted as 146. Matching character sequence 146 may aid in selecting index elements of the results. When referred to as scrolling, result list 145 and list 135 may each be scrolled as depicted by 150. However, it should also be appreciated that character set employed for a displayed list may be modified by scrolling in other arrangements.

Based on selection of result listing 145, the user interface may display window 165 to include one or more graphical display elements for media titles of the dataset associated with the selection. The display of the user interface may include an identification of the selected index element, depicted as 170, and one or more selectable elements depicted as 175$_{1-n}$. The user interface may allow for the user to highlight and select a display element based on focus element 180. Focus element 180 may include one or more graphical treatments to the display element, such as a glow accent, highlighting and/or change in display size. In that fashion the user may employ the focus element to navigate to one or more media titles associated with selected index element 170. Display of elements depicted as 175$_{1-n}$ may allow for scrolling when a plurality of media tiles relate to index element 170. User interface display of media titles may be based on a grid formation, menu based format, and/or detailed view to provide details of a media title. In certain embodiments, display of graphical elements may relate to an animation of one or more graphical elements.

Graphical elements 175$_{1-n}$ may be displayed for media titles as cover artwork or a graphic tile. Selected media titles may further be arranged based on one or more categories. Graphical display of elements 175$_{1-n}$ may relate to artwork (e.g., cover art) associated with the media title and, in some instance include text or graphics to identify the media title. The user interface may further display text associated with a media title as one of graphical elements 175$_{1-n}$.

Although the user interface of FIG. 1 is described above with reference to media titles, it should be appreciated that the user interface may be employed for graphical display and/or presentation of different types of elements including but not limited to account management files, personnel files, data folders, calendar entries, contacts, etc. It should also be appreciated that additional, or fewer, media titles may be displayed in the user interface display window. The user interface may be presented as an animation of graphical display elements.

The display of the user interface as described in relation with FIG. 1 may be associated with a process for presenting a user interface as will be discussed in FIG. 2 below. Although the description of elements is associated with media titles for a data set, it may be appreciated that the user interface elements may be employed for searching or access to other elements.

Figure 2:
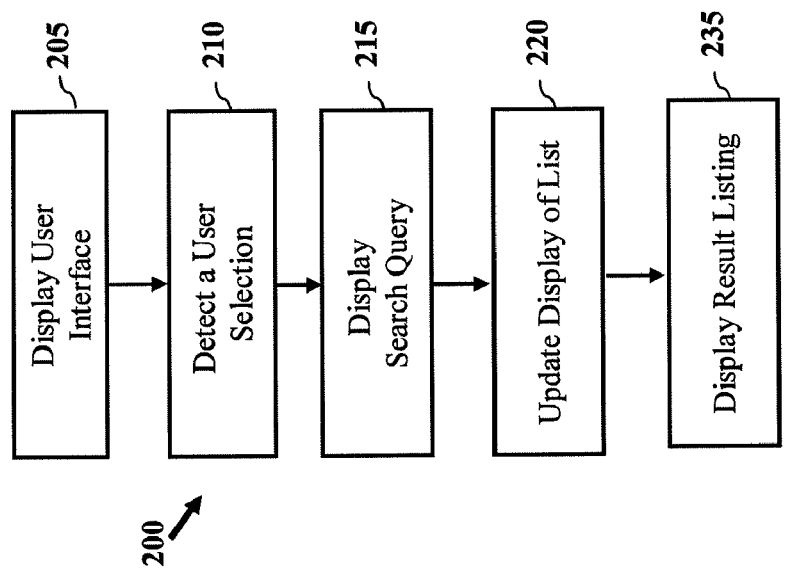
FIG. 2 depicts a process for user interface operation according to one embodiment.

Referring now to FIG. 2, a process is depicted for presenting a user interface according to one or more embodiments of the invention. Process 200 may be performed by a device to present a user interface for selecting and/or navigating to one or more media titles. The user interface may be employed for one or more of media browsing, viewing network data, network applications, file management, etc. In certain embodiments, the user interface may be employed for viewing and selecting media titles which are stored and/or retrievable by a device via a network connection. Process 200 may be initiated by displaying a user interface at block 205.

Display of the user interface at block 205 may include one or more graphical elements, such as a scrollable list (e.g., list 110), and a focus element (e.g., focus element 115) to identify a selectable character. In one embodiment, the user interface may update or modify the display of elements based on one or more user commands. For example, user commands received from an input device and/or from a remote control may allow for a user to navigate displayed elements of the user interface.

At block 210 of process 200, a user selection may be detected. The user selection may relate to movement of a focus element (e.g., focus element 115) to one or more displayed elements of the user interface, scrolling of a list of characters (e.g., list 110) or selection of a character from the list. In one embodiment, a user selection or navigation command may be generated by a user selecting a button of an input device (e.g., device button of a controller, remote control, etc.). By way of example, user activation of a control button may be assigned to navigating the user interface. The control button may be assigned one or more direction commands, such as back/forward, and up/down commands. The button may relate to a hard or soft key for detecting a user selection. In certain embodiments, the user interface may update the display arrangement based on the user activation of the button and the period of activation.

When a user selects one or more characters from a list (e.g., list 110), a search query (e.g., search query 130) is able to be generated and displayed at block 215. Based on the selection, the user interface may additionally update a character set of the list at block 220. The character set is able to be updated based on one or more index elements, such as keywords, associated with media titles of the data set. Updating the display of the list may include display of a reduced character set.

Based on the search query, the user interface may display one or more results that a user can select at block 235. The results may relate to a listing of keywords or titles, such as a result list, selected based on the search query. In one embodiment, the result list may be based on a matching character sequence of the search query to the keyword.

Figure 3:
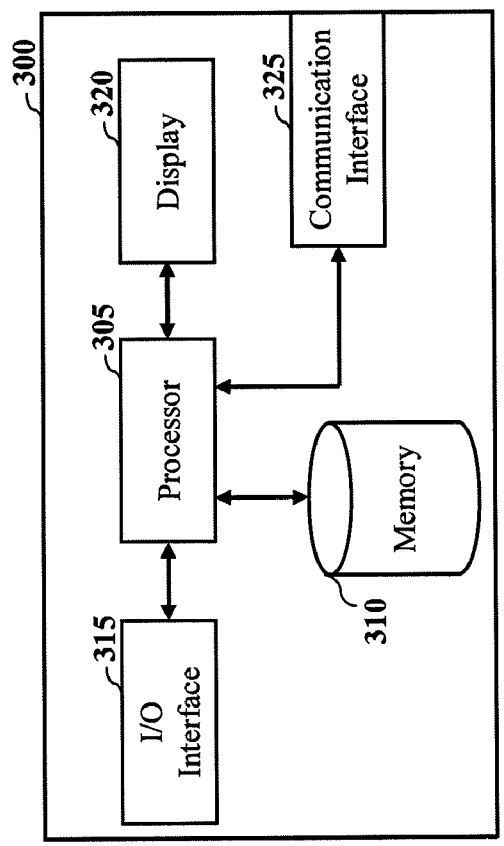
FIG. 3 depicts a simplified block diagram of a device according to one embodiment.

Referring now to FIG. 3, a simplified block diagram is depicted of a device according to one embodiment. In one embodiment, device 300 may be configured to display a user interface as described herein. In one embodiment, device 300 may relate to a display device, such as a television display, for viewing media. It may also be appreciated that device 300 may relate to one or more devices configured to provide data to a display device such as, a set-top box, gaming console, media player (e.g., DVD, Blu-ray™, audio player, etc.), network based communication module, personal communication device, tablet computer, etc. In a further embodiment, device 300 may relate to a portable electronic device such as a media player, personal communication device, etc. Device 300 may be configured to employ one or more of the processes described herein for a user to explore media content and select one or more media titles. In certain embodiments, device 300 may be configured to perform one or more of the processes described herein to select on-demand media and/or files via a network connection. Device 300 may be configured to execute a computer readable program, such as an application, allowing for construction of search queries and presentation of a user interface.

As shown in FIG. 3, device 300 includes processor 305, memory 310, input/output (I/O) interface 315, display 320 and communication interface 325. Processor 305 may be configured to control operation of device 300 based on one or more computer executable instructions stored in memory 310. Memory 310 may relate to one of RAM and ROM memories and may be configured to store one or more media files, content, and computer executable instructions for operation of device 300.

I/O interface 315 may include one or more buttons for user input, such as a numerical keypad, volume control, channel control, menu controls, pointing device, track ball, mode selection buttons, and playback functionality (e.g., play, stop, pause, forward, reverse, slow motion, etc). Buttons of I/O interface 315 may include hard and soft buttons, wherein functionality of the soft buttons may be based on one or more applications running on device 300. I/O interface 315 may be employed for one or more user commands, such as scrolling or selection of a graphical element of a user interface (e.g., user interface of FIG. 1). I/O interface 315 may additionally be configured to decode one or more remote control commands for navigating a user interface. In another embodiment, device 300 may include one or more optical drives, not shown in FIG. 3, which may be configured to detect and decode one or more media files stored on a disc (e.g., CD, DVD™, Blu-ray™, etc.). Display 320 may be employed to display a user interface. In certain embodiments, display 320 may relate to a touch screen display configured to detect one or more user selections of the display. It may be appreciated that display 320 may be optional in certain embodiments.

Communication interface 325 may be configured to allow for network based communications including but not limited to LAN, WAN, Wi-Fi, etc. In certain embodiments, communication interface 325 may be configured to allow for one or more devices to communicate with device 300 via wired or wireless communication. Communication interface 325 may additionally include one or more ports for receiving data, including ports for removable memory.

Figure 4:
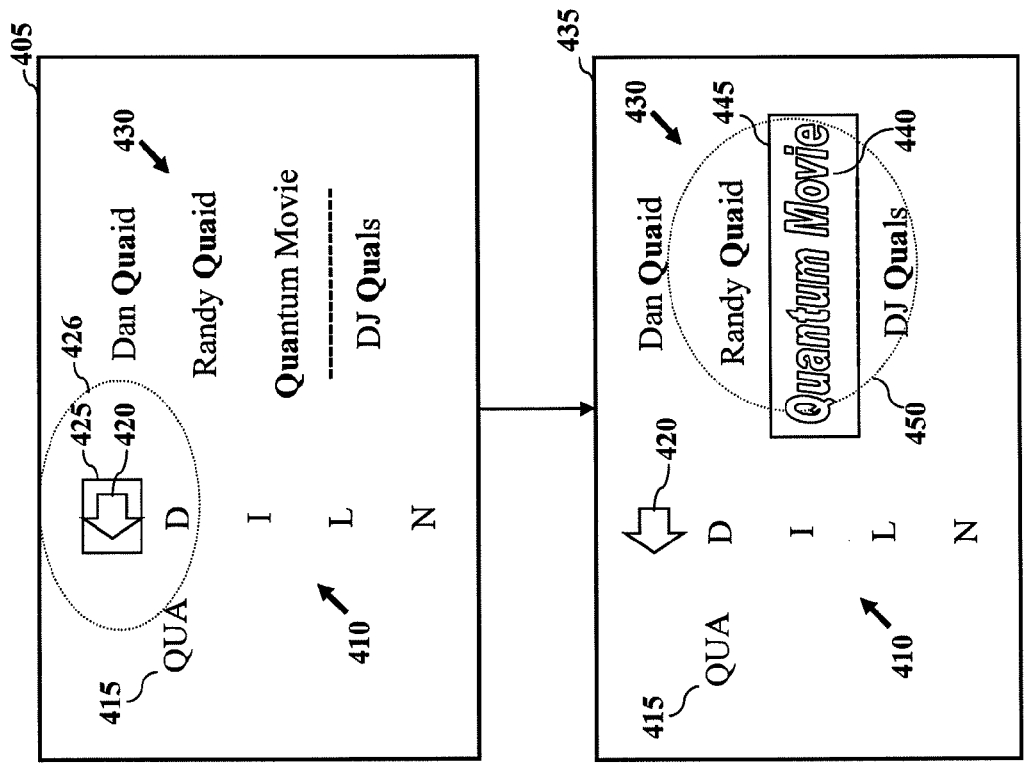
FIG. 4 depicts a graphical representation of user interface navigation according to one or more embodiments.

Referring now to FIG. 4, a graphical representation is depicted of user interface operation according to one or more embodiments. Display window 405 of the user interface includes list 410 (e.g., list 110) and a graphical representation of search query 415. List 410 may relate to a scrollable list with a reduced character set based on search query 415 and one or more index elements of a data set. Backspace button 420 may be selected to delete one or more characters of search query 415.

According to one embodiment, the user interface may allow for focus element 425 (e.g., focus element 115) to be positioned by a user on one or more display elements. Based on the position of focus element 425, a user may navigate or select elements of the user interface. In display window 405, focus element 425 is positioned on backspace button 420. As depicted, back space button 420 is highlighted by focus element 425 and spotlight treatment 426. Spotlight treatment 426 may be applied to different elements of the user interface based on the position of focus element 425. User interface 405 further includes a display of result listing 430 (e.g., result listing 145) based on search query 415.

The user interface allows for a user to position a focus element as depicted in display window 435. The focus element may be employed to select one or more index elements or keywords of result listing 430. As depicted in window 435, keyword 440 is selected. As such, the graphical display of the keyword is adjusted relative to other keywords of result listing 430. In addition, the focus element 445 is depicted as highlighting keyword 440. The user interface may additionally include spotlight treatment 450 for the selected item.

Figure 5:
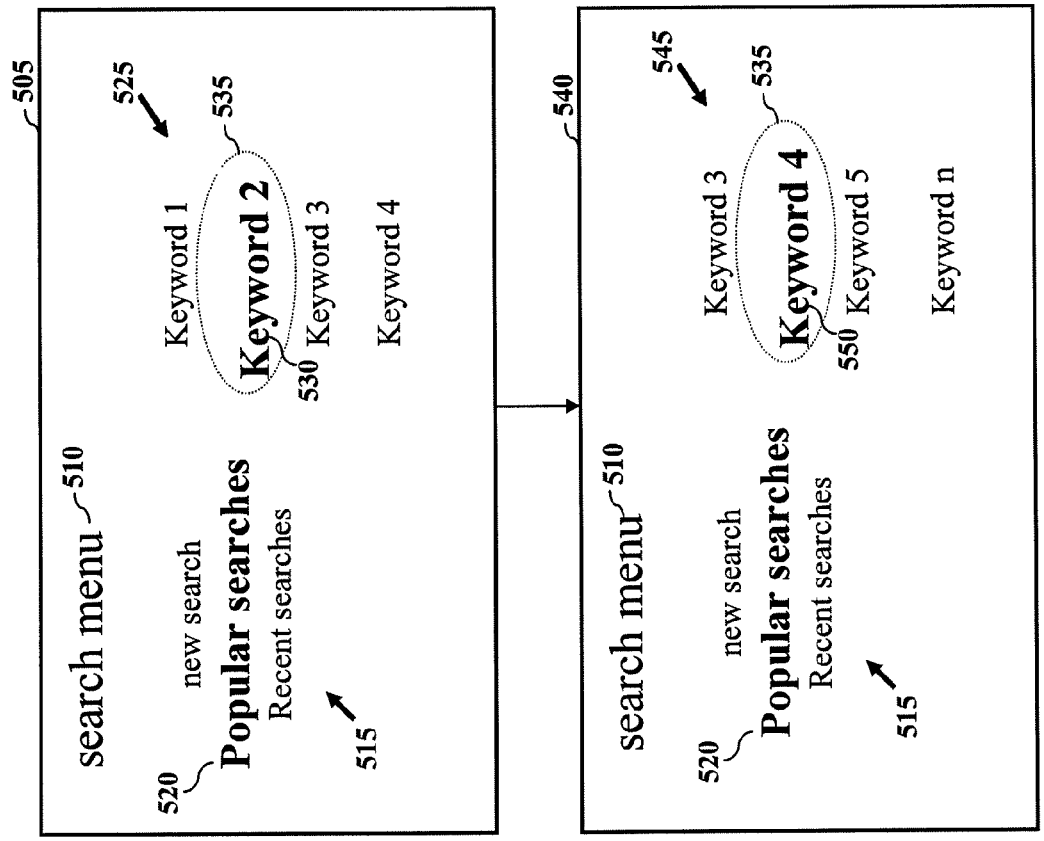
FIG. 5 depicts a graphical representation of user interface navigation according to one or more embodiments.

According to another embodiment, the user interface may be configured to provide a menu for selecting one or more search options. In that fashion, the user interface may advantageously allow for a user to view previous search keywords and/or select one or more popular keywords. Referring now to FIG. 5, a graphical representation of user interface operation is depicted according to one embodiment. Display window 505 includes identification of the menu as depicted by 510. Menu 510 may relate to a search menu that may be accessed by the user. Display window 505 includes display of menu list 515 including a plurality of categories that may be individually selected. Selection of a new search category may allow a user to specify a search query as described herein. Selection of popular searches category 520 may allow for a user to view a listing of one or more index elements or keywords that are highest rated. Index data for the popular searches may be received via a network connection. It may be appreciated that one of a server or third party may provide ratings for index elements and/or media titles. Recent searches may relate to one or more previously utilized keywords by a user for searching a data set.

The selected category of the search menu 510 may format the display of a category as depicted by selected popular searches category 520. As further depicted in display window 505, the selection of popular searches may result in display of listing 525 by the user interface including a plurality of popular keywords. Keyword listing 525 is depicted as including a listing of index elements, however it should also be appreciated that other keywords, such as actor names may be displayed in addition to or separately from title keywords. The user interface may select a title that is highlighted as depicted by 530. The user interface may additionally apply spotlight treatment to a selected keyword as shown by 535.

Based on a user command to navigate to, or scroll, keyword listing 525, the user interface may update the display of the keywords. As depicted in display window 540, user scrolling of the keyword list may result in updating list 545, wherein the elements of the keyword list are modified with respect to list 525. In keyword list 545, Keyword 4, depicted as 550, is displayed with highlighting. When scrolling, the focus element position of the keyword listing may remain in fixed position, as keyword elements scroll relative the focus area.

The display configurations described in FIG. 5 may advantageously allow for a user to navigate to one or more previous selections without having to perform a previous search. In one embodiment, the user interface may display the most recent search keywords when recent searches of menu list 515 is selected.

In one embodiment, a device may include a dedicated button or receive a particular command from an input device (e.g., remote control) to display the search menu of FIG. 5. Search menu 510 may be displayed for the user to selection one or more navigation options. Display configurations of FIG. 5 may additionally include one or more categories for searching media titles.

Figure 6:
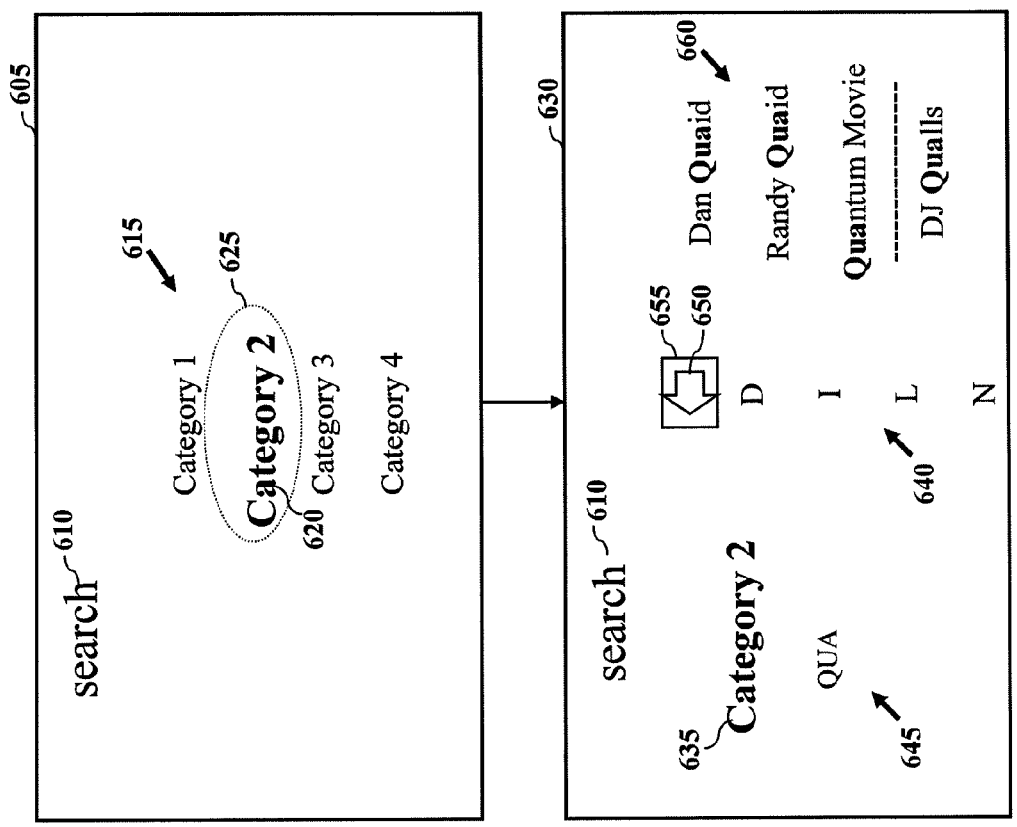
FIG. 6 depicts a graphical representation of user interface operation according to one or more embodiments.

Referring now to FIG. 6, a graphical representation is depicted of process for presenting a user interface according to another embodiment. Display window 605 relates to a graphical representation of a user interface allowing for a search query to be selected based on one or more categories. As depicted in window 605, the user interface may include identification of search menu 610 and listing 615 of categories. Listing 615 may relate to categories of media titles in the data set. For example, listing 615 may relate to categories for drama, suspense, thriller, crime, action, comedy, etc. The user interface may display a selected category with increase size, depicted as 620, and spotlight treatment 625 to identify a selectable or highlighted category.

The user interface may additionally allow the user to scroll list 615 in order to select different categories. It should also be appreciated that multiple categories may be selected according to another embodiment. Categories may be determined for more than media title's including, cast, director, awards, movie category, keyword category, date, and rating. It should also be appreciated that other categories may be employed for arranging and selecting items for the user interface.

The user interface may allow for a user to specify one or more characters for generating a search query. As depicted in display window 630, the user interface includes a display of the selected category 635 and list 640. List 640 may allow the user to select one or more characters for the query. The user interface may additionally depict query 645. Display of the list may include back button 650 and a focus element depicted as 655. Based on the selected category 635 and search query 645, the user interface may display result list 660. Result list 660 may relate to one or more keywords that is associated with both the search query and category.

While this document has been particularly shown and described with references to exemplary embodiments thereof, it will be understood by those skilled in the art that various changes in form and details may be made therein without departing from the scope encompassed by the appended claims.

What is claimed is:

1. A method for presenting a user interface with a device, the method comprising:
    displaying, with a device, a scrollable list of characters associated with a character set and a focus element that identifies one of the scrollable list of characters;
    detecting a selection of one of the scrollable list of characters with the device, wherein the selected character is the one of the scrollable list of characters that is identified by the focus element;
    displaying a search query based on the selection with the device;
    updating the character set of the scrollable list with the device based at least in part on the search query and index elements of a dataset; and
    displaying a result listing based on the search query with the device, wherein the result listing identifies one or more index elements including a matching character sequence relative to the search query.

2. The method of claim 1, wherein the scrollable list of characters includes a plurality of alpha-numeric characters associated with the character set.

3. The method of claim 1, wherein the focus element relates to a selection area having one or more of a glow accent and display characteristic to identify a character of the scrollable list.

4. The method of claim 1, wherein displaying the search query relates to display of one or more characters as a search string.

5. The method of claim 1, wherein updating a character set relates to reducing characters of the character set based on index elements of the dataset that may be determined relative to the search query.

6. The method of claim 1, wherein displaying a result listing relates to an ordered listing of index elements, the index elements relating to one or more of keywords, media titles, and actor name, director name, genre and category for indexing media titles.

7. The method of claim 1, wherein the result listing includes a preferred results section, and a section including index elements presented in alphabetical order.

8. The method of claim 1, further comprising receiving a user command to scroll the scrollable list of characters, and updating the scrollable list.

9. The method of claim 1, further comprising receiving a selection of the result listing, and displaying graphical elements for media titles based on the selection of the result listing.

10. The method of claim 1, further comprising displaying one or more results based on a character associated with the focus element prior to selection of a character.

11. A non-transitory computer readable storage medium storing a computer executable code that when executed by a processor on a device causes the device to:
    display a scrollable list of individual characters associated with a character set and a focus element that identifies one of the scrollable list of individual characters;
    detect a selection of one of the scrollable list of individual characters with the device, wherein the selected character is the one of the scrollable list of individual characters that is identified by the focus element;
    display a search query based on the selection;
    update the character set of the scrollable list based at least in part on the search query and index elements of a dataset; and
    display a result listing based on the search query, wherein the result listing identifies one or more index elements including a matching character sequence relative to the search query.

12. The non-transitory computer readable storage medium of claim 11, wherein the scrollable list of characters includes a plurality of alpha-numeric characters associated with the character set.

13. The non-transitory computer readable storage medium of claim 11, wherein the focus element relates to a selection area having one or more of a glow accent and display characteristic to identify a character of the scrollable list.

14. The non-transitory computer readable storage medium of claim 11, wherein displaying the search query relates to display of one or more characters as a search string.

15. The non-transitory computer readable storage medium of claim 11, wherein updating a character set relates to reducing characters of the character set based on index elements of the dataset that may be determined relative to the search query.

16. The non-transitory computer readable storage medium of claim 11, wherein displaying a result listing relates to an ordered listing of index elements, the index elements relating to one or more of keywords, media titles, and actor name, director name, genre and category for indexing media titles.

17. The non-transitory computer readable storage medium of claim 11, wherein the result listing includes a preferred results section, and a section including index elements presented in alphabetical order.

18. The non-transitory computer readable storage medium of claim 11, wherein the executable code when executed further causes the device to receive a user command to scroll the scrollable list of characters, and computer readable code to update the scrollable list.

19. The non-transitory computer readable storage medium of claim 11, wherein the executable code when executed further causes the device to receive a selection of the result listing, and computer readable code to display graphical elements for media titles based on the selection of the result listing.

20. The non-transitory computer readable storage medium of claim 11, wherein the executable code when executed further causes the device to display one or more results based on a character associated with the focus element prior to selection of a character.

21. A system, comprising:
    a display;
    a memory; and
    a processor coupled to the display, and memory, the processor configured to:
        control display of a scrollable list of characters associated with a character set and a focus element that identifies one of the scrollable list of characters;
        detect a selection of one of the scrollable list of characters with the device, wherein the selected character is the one of the scrollable list of characters that is identified by the focus element;
        control display of a search query based on the selection;

update the character set of the scrollable list based at least in part on the search query index elements of a dataset; and
control display of a result listing based on the search query, wherein the result listing identifies one or more index elements including a matching character sequence relative to the search query, wherein the result listing includes popular search queries of other users.

* * * * *